United States Patent
Anderson et al.

[11] Patent Number: 6,131,636
[45] Date of Patent: *Oct. 17, 2000

[54] LAMINATING MACHINE

[76] Inventors: Peter J. Anderson, 29 E. Wharf Rd., Madison, Conn. 06443; Willis A. Murphy, 28 Hemlock Ter., Deep River, Conn. 06417

[ * ] Notice: This patent is subject to a terminal disclaimer.

[21] Appl. No.: 09/108,855

[22] Filed: Jul. 1, 1998

Related U.S. Application Data

[63] Continuation-in-part of application No. 08/936,443, Sep. 24, 1997, Pat. No. 5,853,531.

[51] Int. Cl.$^7$ .................................................. B32B 31/00
[52] U.S. Cl. ............................ 156/555; 156/582; 100/176
[58] Field of Search ..................................... 156/555, 580, 156/582, 583.1; 100/155 R, 160, 176

[56] References Cited

U.S. PATENT DOCUMENTS

| | | | |
|---|---|---|---|
| 2,542,901 | 2/1951 | Chaffee | 156/498 |
| 3,340,130 | 9/1967 | Dunn et al. | 156/552 |
| 3,711,355 | 1/1973 | Staats et al. | 156/499 |
| 3,901,758 | 8/1975 | Humphries | 156/499 |
| 4,116,749 | 9/1978 | Dufort et al. | 156/555 |
| 4,172,750 | 10/1979 | Giulie | 156/267 |
| 4,387,000 | 6/1983 | Tancredi | 156/495 |
| 4,420,680 | 12/1983 | Itoh | 219/469 |
| 4,451,320 | 5/1984 | Marvel | 156/366 |
| 4,743,334 | 5/1988 | Singer | 156/499 |
| 5,139,600 | 8/1992 | Singer | 156/301 |
| 5,158,641 | 10/1992 | Vermeulen et al. | 156/555 |
| 5,728,257 | 3/1998 | Lee | 156/555 |
| 5,746,878 | 5/1998 | Kuhns et al. | 156/364 |
| 5,772,841 | 6/1998 | Lindsay | 156/555 |
| 5,853,531 | 12/1998 | Murphy et al. | 156/555 |

*Primary Examiner*—James Sells
*Attorney, Agent, or Firm*—Robert H. Montgomery

[57] ABSTRACT

A laminating machine of the type which laminates documents between sheets of plastic or on a substrate comprising a housing, first and second sets of upper and lower rolls within said housing having end shafts, one of the sets of rolls arranged to receive material to be laminated and move the material to the other of the sets of rolls, spaced apart end supports are in housing rotatably supporting the end shafts, drive means are connected to the lower rolls of each pair, to drive the lower rolls, the upper rolls of each pair are mounted in the end supports to move upwardly to accommodate material of variable thickness, resilient power transmission means are connected between the upper rolls and the lower rolls and driven from the lower rolls to maintain synchronization of rotation of the upper rolls with the lower rolls and to bias the upper rolls downwardly while permitting the upper rolls to move upwardly to an extent dependent on the thickness of material passing between the pairs of rolls.

15 Claims, 9 Drawing Sheets

LAMINATING MACHINE

RELATED APPLICATIONS

This application is a continuation-in-part of application Ser. No. 08/936,443, filed Sep. 24, 1997, now U.S. Pat. No. 5,853,531.

FIELD OF THE INVENTION

This invention relates to plastic laminating machines and laminating machines which have a new capability of laminating documents, including photographs, to thick substrates such as foam board.

BACKGROUND OF THE INVENTION

Pouch laminating machines as well as roll feed laminating machines for documents are well known. The pouch machines generally comprise a pair of heated platens through which a document enclosed in the pouch is passed between drive rolls to the platens. The pouch is generally a folded over plastic material having thermal properties and adhesives thereon which will bond the plastic to the document to be protected and also the edges of the plastic sheets to each other. The pouch may be within a holder or carrier which is suitably coated to receive any overflow of adhesive material from the pouch and prevent such adhesive material from being deposited on the drive rolls.

Such laminating machines are limited in the thickness of material which may be laminated.

One laminating machine marketed by USI, Inc. of Madison, Conn. provides the ability to accept materials of slightly greater thickness than normal by permitting a small increase in separation of the entrance and exit rolls which does not exceed a dimension which would cause separation of the drive gearing.

This machine comprises a first set of entrance rolls and a second set of exit rolls on either side of upper and lower heating platens. One roll is driven by an electric motor, through gears on the shafts of the rolls and an idler gear the first and second sets of rolls are synchronized. The upper rolls of the first and second sets are journaled in somewhat flexible arms which permit acceptance of materials of a small variation in thickness. However, such variation is limited by the gear teeth. If the gearing between the rolls of each set separates feed of the material is lost.

Other examples of prior art laminating machines are shown in U.S. Pat. Nos. 2,542,901, 3,340,130, 3,711,355, 4,116,749, 4,172,750 and 4,451,320.

The prior art devices discussed above and shown by the aforementioned patents are not suitable for accepting documents of varying thickness, particularly when a thick backing such as foam board is used as a substrate.

Another type of laminating machine is termed a roll laminator. In this type of machine upper and lower supply rolls of plastic film supply film between a first pair of upper and lower laminating rolls which are heated. The film from the supply rolls may be passed over heat shoes or preheat rollers for preheating before entering the nip of the laminating rolls.

In this type of machine the upper rolls of each pair are not driven from the primary power source but only by friction from contact with the material being laminated. An example of a roll laminator is disclosed in U.S. Pat. No. 4,743,334.

This type of machine requires adjustment of a bias on the upper rolls of each pair for pressure between the upper and lower rolls of each pair and/or the permissible thickness of material to be laminated.

Accordingly, the present invention provides a new and improved laminating machine in which the upper roll of a pair of rolls may move upwardly to provide clearance for thick material and auxiliary drive means are provided for driving all rolls in synchronization when the gearing of the rolls of a set of rolls move out of mesh due to the thickness of the material or a substrate therefore.

The invention further provides a laminating machine of the pouch or roll type in which the upper rolls of each pair are driven in synchronism by resilient belts from the lower directly driven rolls. The resilient belts bias the upper rolls downwardly while permitting the upper rolls to move upwardly to accept materials of varying thickness between the upper rolls.

An object of this invention is to provide a laminating machine for laminating a wide range of thickness of documents which is of new and improved construction.

Another object of this invention is to provide a laminating machine for laminating documents within plastic which provides a new and improved structure for accepting documents of varying thickness, and documents on thick substrates.

A further object of this invention is to provide laminating machines in which the upper rolls are driven in synchronism with the lower by a resilient drive means which biases the upper rolls downwardly but permits the upper rolls to move upwardly to accept materials of varying thickness.

SUMMARY OF THE INVENTION

Briefly stated, the invention, in one form thereof, comprises a laminating machine of a type which laminates documents between sheets of plastic in a pouch or in roll fed plastic sheet material comprising a housing, a first set of rolls within said housing member is adapted to receive a pouch, and guide said pouch between upper and lower heating platens within the housing, a second set of rolls within said housing member arranged to receive the pouch from said platens and discharge the pouch from the machine. The first set of rolls, the platens and the second set of rolls define a passage therethrough. Received within the housing in receptacles therefor are end supports for said rolls, which rotatably support the rolls therebetween. Drive means are connected to one of the rolls of one of the pairs, gearing means are provided on one of the end supports including an idler gear for transmitting rotation of one of said rolls to all of said rolls. Means are also provided for accommodating documents of varying thickness which permit separation of the rolls of each pair in accordance with the thickness of the document to be laminated. The upper rolls of each pair are journaled in members which may move upwardly on the end supports and permit a large degree of separation of the rolls of a pair. Auxiliary drive means are connected to the ends of the rolls which provide a continuous drive for the rolls and synchronization thereof when the rolls separate a distance which causes loss of mesh of the gears between the upper and lower rolls of a pair.

In another embodiment of the invention the upper rolls of the pairs need not be geared to the driven rolls. The auxiliary drive means provide both a downward bias on the upper rolls and synchronizes the upper rolls with the directly driven lower rolls. This is accomplished with resilient belts connecting pulleys on the ends of both sets of rolls. The flexible belts permit upward movement of the upper rolls to accept material of different thickness while maintaining a downward bias on and synchronize rotation of the upper rolls with the lower directly driven rolls.

The invention may also be embodied in a machine which only includes the exit rolls.

The features of the invention which are believed to be novel are particularly pointed out and distinctly claimed in the concluding portion of this specification. The invention, however, together with further objects and advantages thereof may best be appreciated by reference to the following detailed description taken in conjunction with the drawings.

DETAILED DESCRIPTION OF PREFERRED EMBODIMENTS OF THE INVENTION

Figure 1:
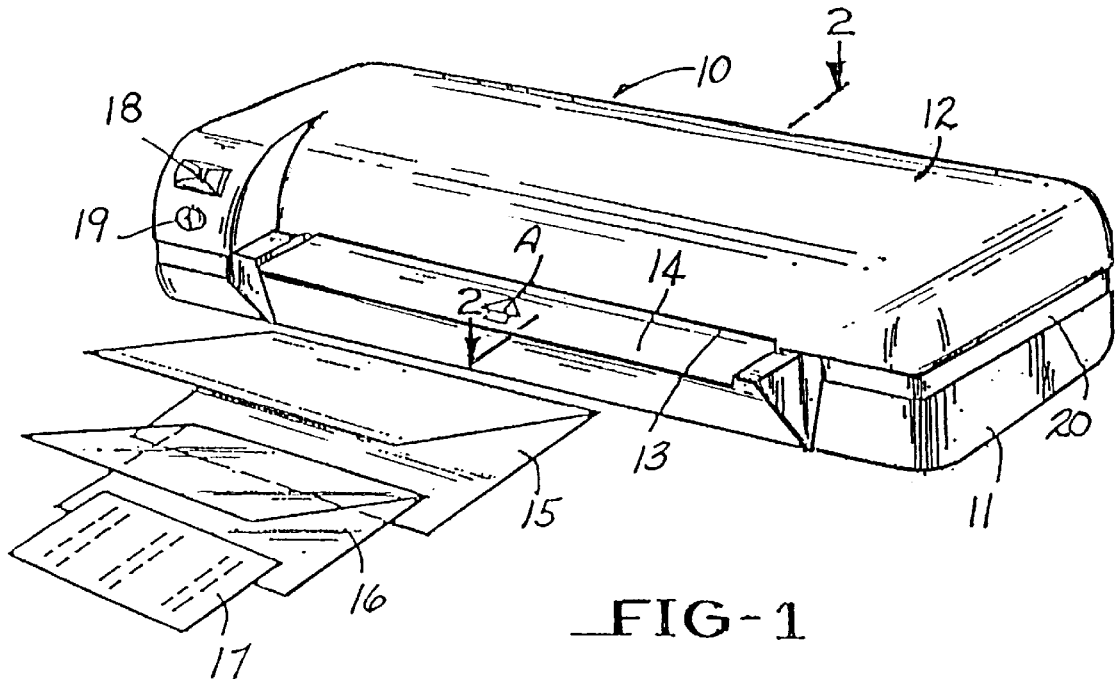
FIG. 1 is a view in perspective of a device embodying the invention.

Reference is now made to FIG. 1 which discloses a pouch laminating machine 10 embodying the invention which has a lower housing member 11 and an upper housing member 12 which is adapted to receive a document to be laminated through an entrance way 13 in the direction of arrow A. The document to be laminated is inserted into entrance 13 via a platform 14.

As is conventional with pouch laminating machines a carrier 15 is provided which generally has a waxed or otherwise coated surface to accept any overflow of adhesive from a pouch 16 in which a document 17 to be laminated is included. The pouch or packet 16 will be coated with a heat sensitive adhesive which will seal the document 17 therein. Thereafter, depending upon the size of the document, the pouch 16 may be cut or trimmed for an acceptable size.

The laminating machine thus far described is of a type referred to as a pouch laminator.

The invention may also be embodied in what is referred to as a roll laminator wherein the laminating machine includes plastic on one or more rolls which are fed into the machine over a heating shoe(s) or roller whereby adhesive substance on the plastic is heated to a bonding temperature. In such roll laminators the pouch 16 or carrier 15 are not required. The material to be protected is laminated between the plastic sheet material fed into the machine from the rolls, or on to a substrate if only one surface need be protected. The invention as applied to a roll laminating machine is hereinafter described.

As shown in FIG. 1, there is an entrance way 13 in the direction of arrow A for acceptance of the carrier 15 with the pouch 16 and document 17 therein. Also as shown in FIG. 1, there may be an OFF and ON switch 18 and also an indicating lamp 19 to indicate that the machine is ready for operation.

The upper housing member 12 may be designed to at least telescopically fit over the lower housing member 11. Depending upon design esthetics, a band 20 may be displayed or evidenced between the lower and upper housing members 11 and 12.

The lower and upper housing members 11 and 12 respectively define opening 13 for insertion of the carrier 15 with the pouch or packet 16 and document 17 to be laminated for receipt therein.

A laminator embodying the invention may also accept other types of sheets to be laminated. For example, a document or photograph may be placed over a dry mount tissue on thick foam board or other substrate and passed through the laminator. In such case the carrier 15 may or may not be used.

Figure 2:
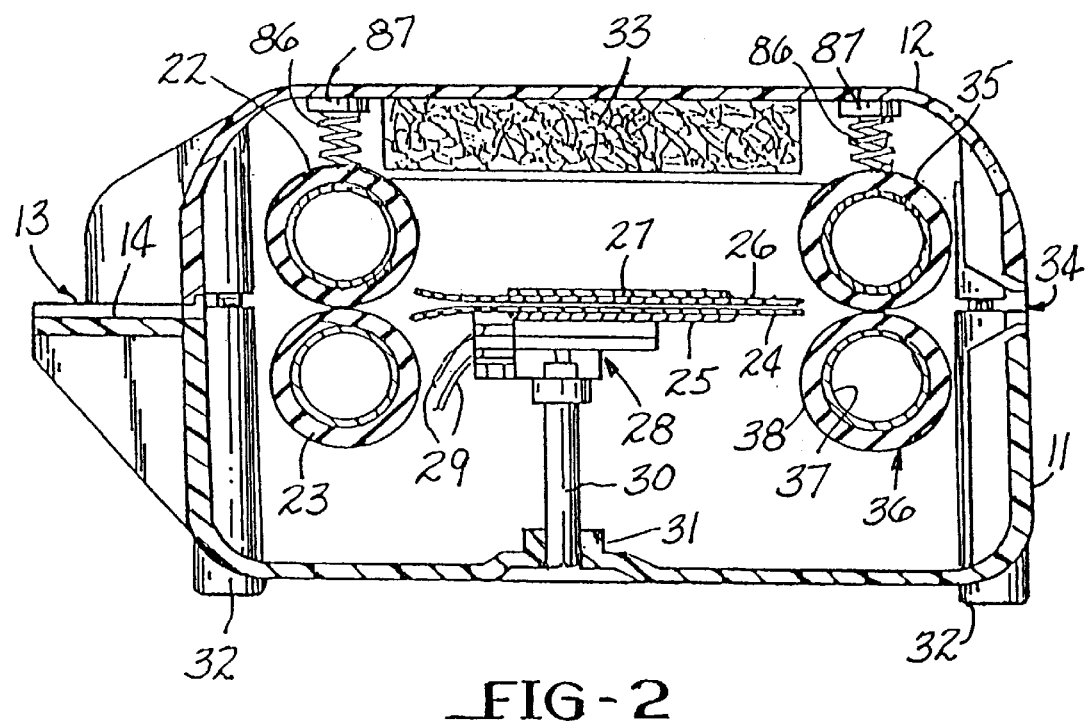
FIG. 2 is a sectional view seen in the plane of lines 2—2 of FIG. 1.

Reference is now made to FIG. 2 which is a sectional view seen along the plane of lines 2—2 of FIG. 1 and exemplifies the interior of the laminating machine 10. FIG. 2 does not show all of the elements which might be seen in the plane of lines 2—2 of FIG. 1, for clarity of illustration and purposes of description, but is presented to show the path presented by the entrance and exit rolls with the intermediate platens.

As a packet or pouch to be laminated is passed through the opening 13 over platform 14 it will initially pass between a pair of entrance rolls 22 and 23 which are driven at a constant speed and then between a lower platen 24 having a heating element 25 thereon and an upper platen 26 having a heating element 27 thereon. A thermostat 28 is in contact with one of the platens here shown as lower platen 24 to control the heat applied thereto. The reference numeral 29 designates electrical leads to the thermostat 28. Other thermostatic means may be provided for controlling the heating elements. The thermostat 28 has an adjusting rod 30 extending therefrom and through an opening 31 in the bottom of housing 11 so that it may be adjusted as by means of a screwdriver or other turning tool. Upper platen 27 may move upwardly with respect to lower platen 24 as material is passed therebetween.

The lower housing member has four feet 32 adjacent the four corners thereof for supporting the laminating machine 10.

A section of insulating material 33 is attached to the inside of upper casing member 12 to thermally isolate the top cover member 12 from the heat of the platens 24 and 26. Defined at the back of the laminating machine 10 between upper housing member 12 and lower housing member 11 is an exit opening 34 whereby the material to be laminated exits between a pair of rolls 35 and 36. Each of the rolls 22, 23, 35 and 36 comprise a metallic cylinder 37 with a rubber or plastic sleeve 38 thereabout as exemplified on roll 36 in FIG. 2, and also FIGS. 4 and 5.

Figure 3:
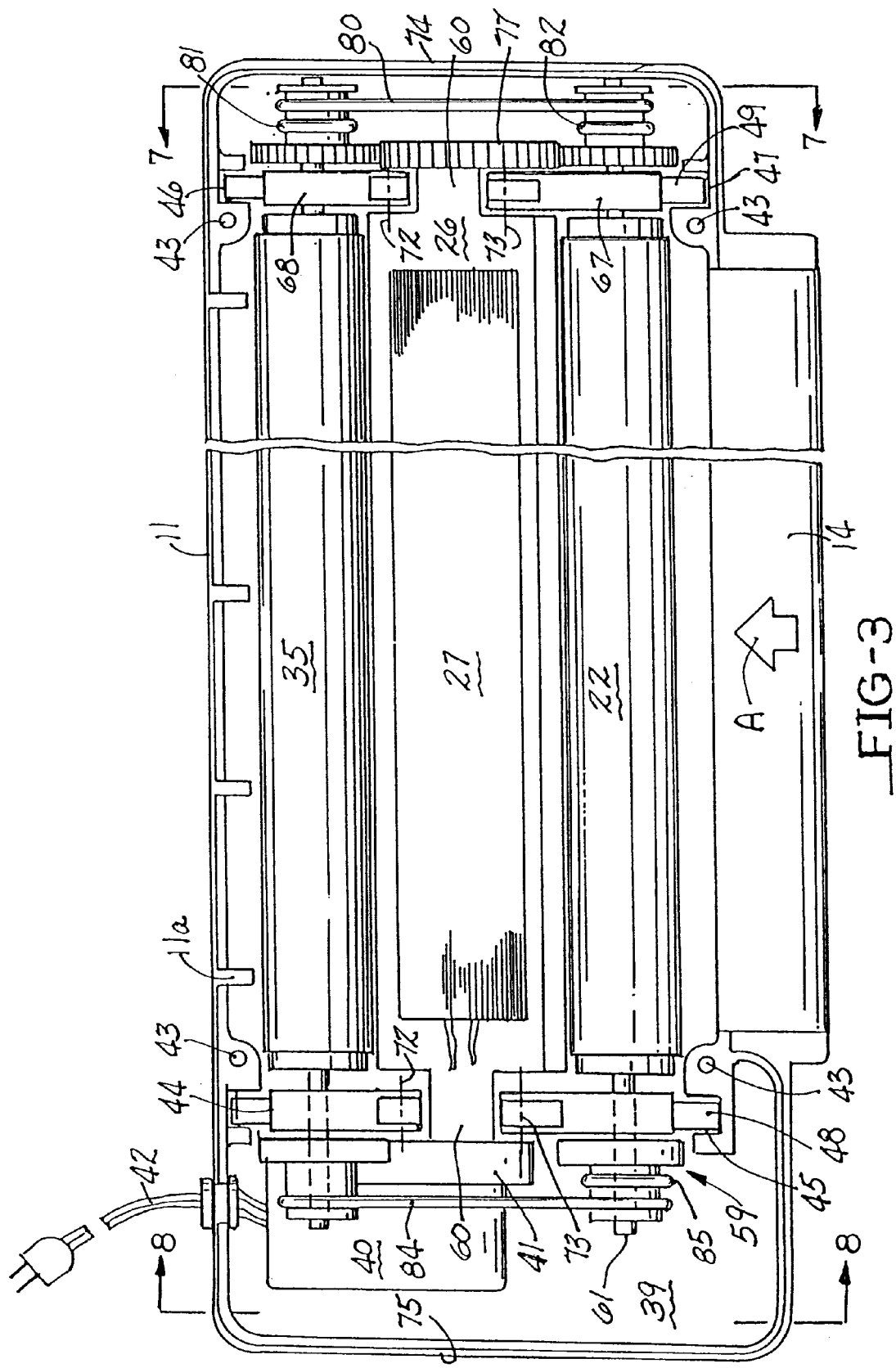
FIG. 3 is a plan view of the device of FIG. 1, with the top cover removed.

Reference is now made to FIG. 3 which is a view of the laminating device 10 with the upper housing member 12 removed. The lower housing member 11 defines a compartment 39 which receives a drive motor 40 connected to suitable gearing 41 which drives roll 36 (not shown in FIG. 3). The reference numeral 42 represents a cord for input of electrical energy to the drive motor, thermostat and the heating elements 25 and 27, as will hereinafter be described.

The legs 32 define therein openings 43 for securing screws which will extend into the upper cover member.

The lower housing member at one end thereof defines slots or receptacles 44 and 45 and at the other end thereof defines slots 46 and 47 for end or support plates which will support the shafts of rolls 22, 23, 35 and 36 as hereinafter made apparent. Received in slots 44 and 45 is a support plate 48. Received in slots 46 and 47 is a support plate 49. Support plate 49 is shown in elevation in FIG. 6 and hereinafter described.

Figure 4:
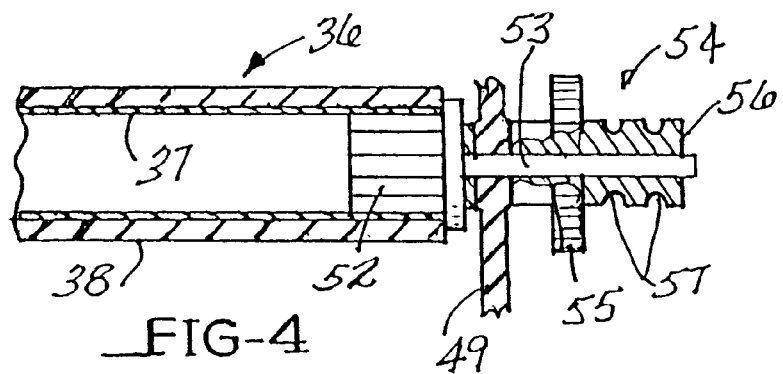
FIG. 4 is a fragmentary view, partially in section, of an end of one of the rolls of FIG. 3 exemplifying the drive coupling of the rolls.

Reference is now made to FIG. 4 which illustrates roll 36, in part at the non-driven end. Roll 36 as previously described comprises cylinder 37 with sleeve 38 thereon. A journal member 51 has an insert portion 52 frictionally received within cylinder 37 or key coupled thereto and a journal shaft portion 53 extending through a bearing opening in end wall 49.

Shaft 53 has thereon a power transmission member 54 which includes a gear 55 and a pulley 56. The gear and pulley may be integral and made of a plastic material such as nylon. Pulley 56 has two annular grooves 57 defined therein which accept pulley belts which may be O-rings.

Figure 5:
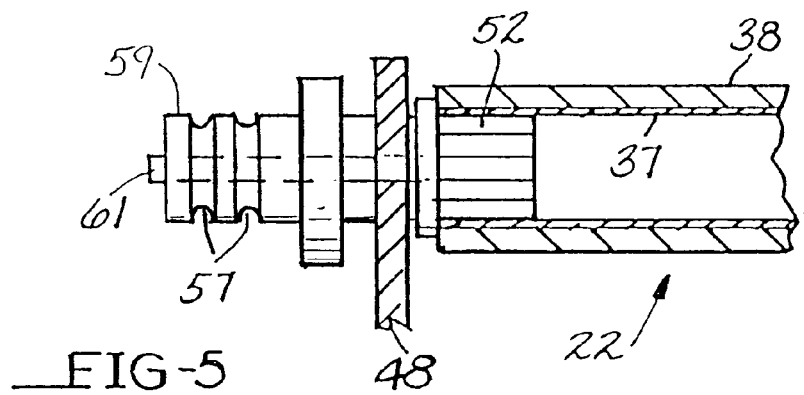
FIG. 5 is a fragmentary view, partially in section, of the other end of the roll of FIG. 4.

Another power transmission member 59 is shown in FIG. 5 which is utilized at the non-geared ends of the rolls. Member 59 omits a gear but is provided with two belt grooves 57. Member 59 is shown attached to roll 22 in FIG. 3 and provides journal shaft 61 for roll 22.

FIG. 4 is representative of the right hand ends of rolls 22, 23, 35 and 36, as viewed in FIG. 3. FIG. 5 is representative of the left hand ends of rolls 22, 23 and 35 as viewed in FIG. 3.

Hereinafter, reference will only be made to the structures of FIGS. 4 and 5 as the gears and/or pulley on the left or right hand ends of rolls 22, 23, 35 and 36 as viewed in FIG. 3 to avoid superfluous reference numerals.

Figure 6:
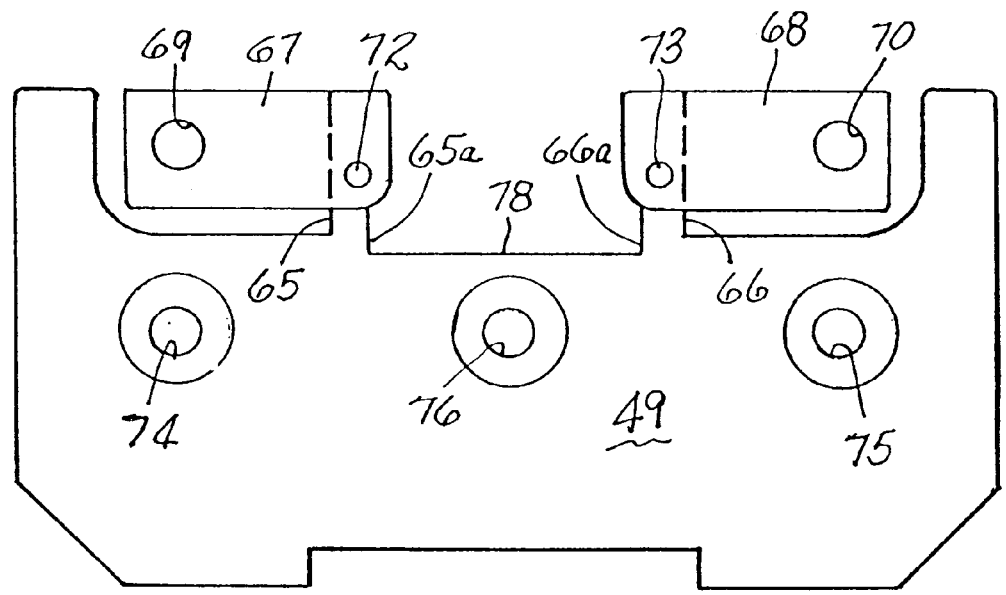
FIG. 6 is a view in elevation of an end support for the rolls.

Reference is now made to FIG. 6 which shows end plate 49. End plates 48 and 49 are identical and only one need be shown. End plate 49 has two upstanding arms 65 and 66 to which are pivoted bearing arms 67 and 68 respectively. The bearing arms define bearings 69 and 70 to receive the journal shafts 53 of rolls 22 and 35. The same bearings on end support 48 will receive the shaft 61 of rolls 22 and 35.

The bearing arms define bearing arm pivots 72 and 73 whose axes are shown in broken line in FIG. 3. Also defined are bearings 74 and 75 for the shafts of rolls 23 and 36 (FIG. 2), respectively, and a bearing 76 which receives a shaft for an idler gear 77 (FIG. 3). Platens 24 and 27 have end portions 60 (FIG. 3) which are supported on edges 78 of end supports 48 and 49.

The arms 65 and 66 have notches 65a and 66a, respectively, defined therein which receive the edges of end portion 60 of the platens and prevent any undue separation of the platens and also retain the platens in place should the machine be turned upside down.

Figure 7:
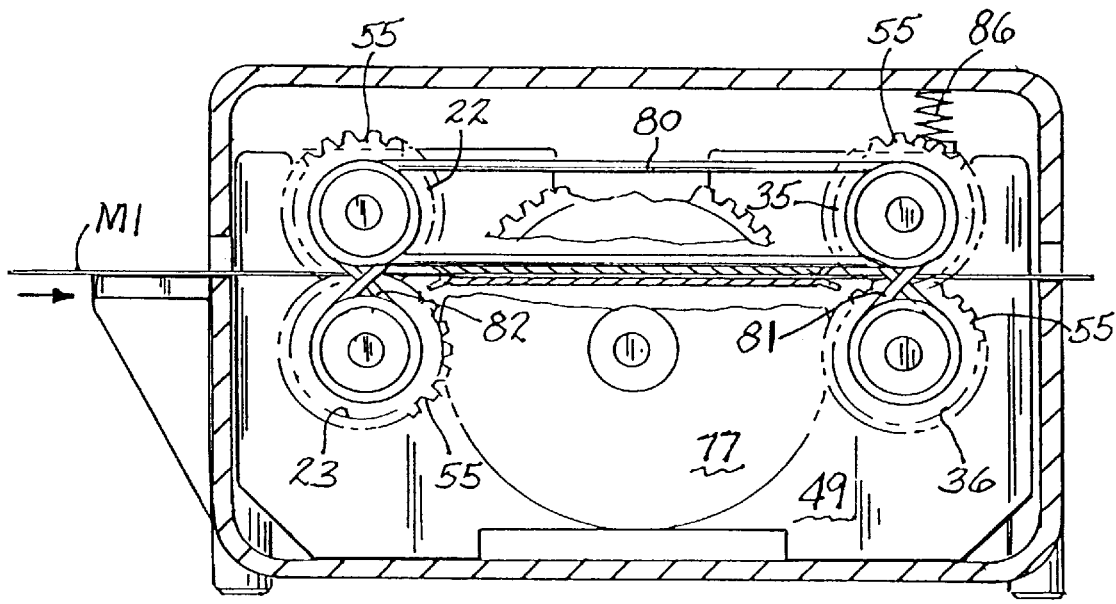
FIGS. 7 and 7a are views seen in the plane of lines 7—7 of FIG. 3 under different operating conditions.

Reference is now made to FIG. 7 taken in conjunction with FIG. 3. FIG. 7 exemplifies the roll drive system when relatively thin material M1 is being laminated. The gears 55 on the end of rolls 35 and 36 are meshing. The rolls 22, 23, 35 and 36 are shown in broken line behind the gears. Gear 55 on roll 36 also drives idler 77. Idler 77 drives gear 55 on roll 23 which in turn drives gear 55 on roll 22. Thus all of the rolls are driven in synchronization to pass material between the platens.

A pulley belt 80 extends about the pulleys 56 of rolls 22 and 35 in one of grooves 57 (FIG. 4). A pulley belt 81 connects the pulleys 56 of rolls 35 and 36. A pulley belt 82 connects the pulleys 56 of rolls 22 and 23.

Figure 8:
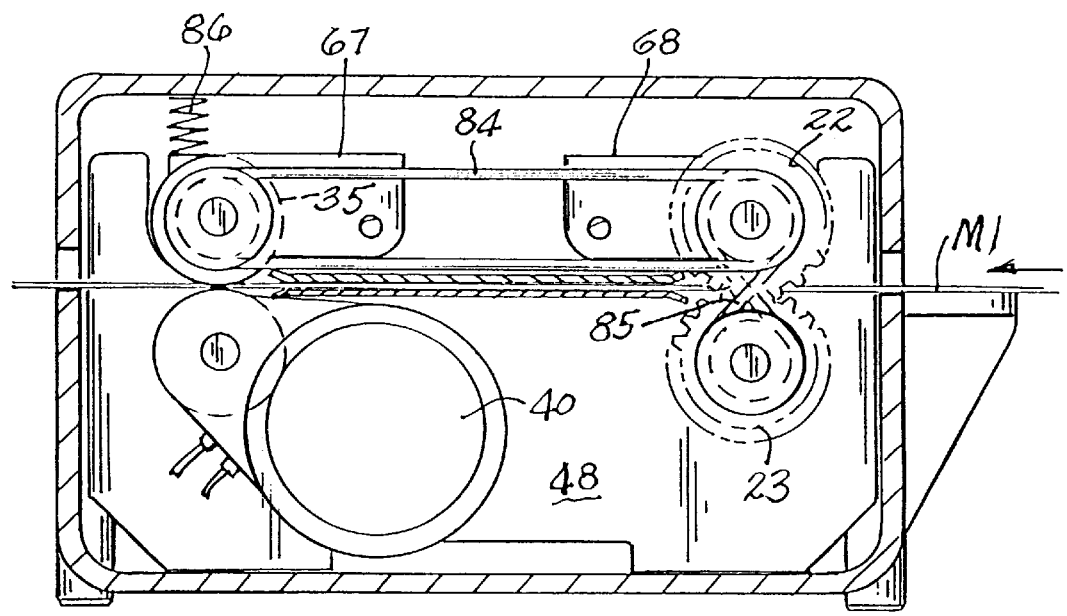
FIGS. 8 and 8a are views seen in the plane of lines 8—8 of FIG. 3 under different operating conditions.

Four springs 86 mounted in housing member 11 bear on bearing arms 67 and 68 on each of supports 48 and 49. Only two springs 86 are shown in FIGS. 7 and 8 for simplicity of illustration. Springs 86 together with spring seats 87 are shown in more detail in FIG. 2. The springs 86 act to maintain upper rolls 22 and 35 in contact with material M1.

Reference is now made to FIG. 8, taken in conjunction with FIG. 3. A pulley belt 84 connects the pulleys 59 of rolls 22 and 35, and a pulley belt 85 connects the pulleys 59 of rolls 22 and 23.

The upper belts 80 and 84 are not absolutely necessary, but are provided for insurance of power transmission. Depending on the size of the machine and the degree of separation of the upper and lower rolls of a pair the number of belts 80 and 84 may be increased on the pulleys at each end.

It will be apparent that the gears on rolls 23 and 36 are always in mesh. Therefore it is necessary to have rolls 22 and 35 in synchronized speed of rotation.

Depending on the maximum thickness of a material M2 and the adhesion of the belts 81, 82 and 85 on their respective pulleys, the belts 80 and 84 may be eliminated. However, for practical purposes, the belts 80 and 84 give insurance that all rolls are in synchronization at all times when the gears on rolls 22 and 35 go out of mesh with the gears on rolls 23 and 36, respectively.

In operation, roll 36 drives roll 35 and also idler gear 77. Idler gear 77 drives roll 23 which in turn drives roll 22. Rolls 22 and 23 accept material M1 and convey it between platens 24 and 27 to exit rolls 34 and 36. The pulley and belt drives are not the primary roll drives at this time since the gears are in mesh.

Figure 7A:
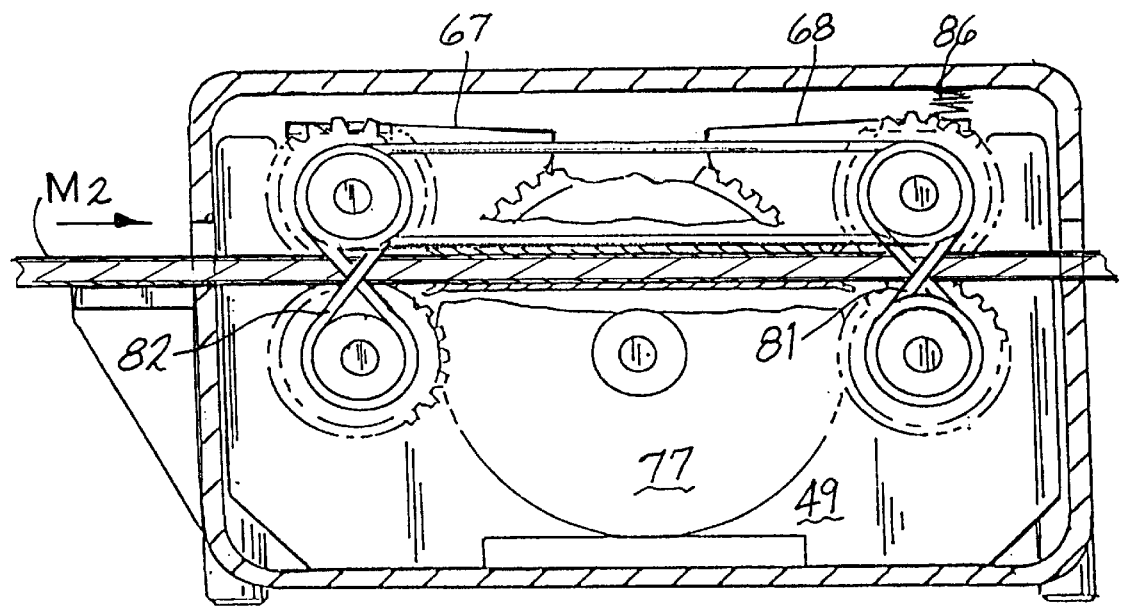
Figure 8A:
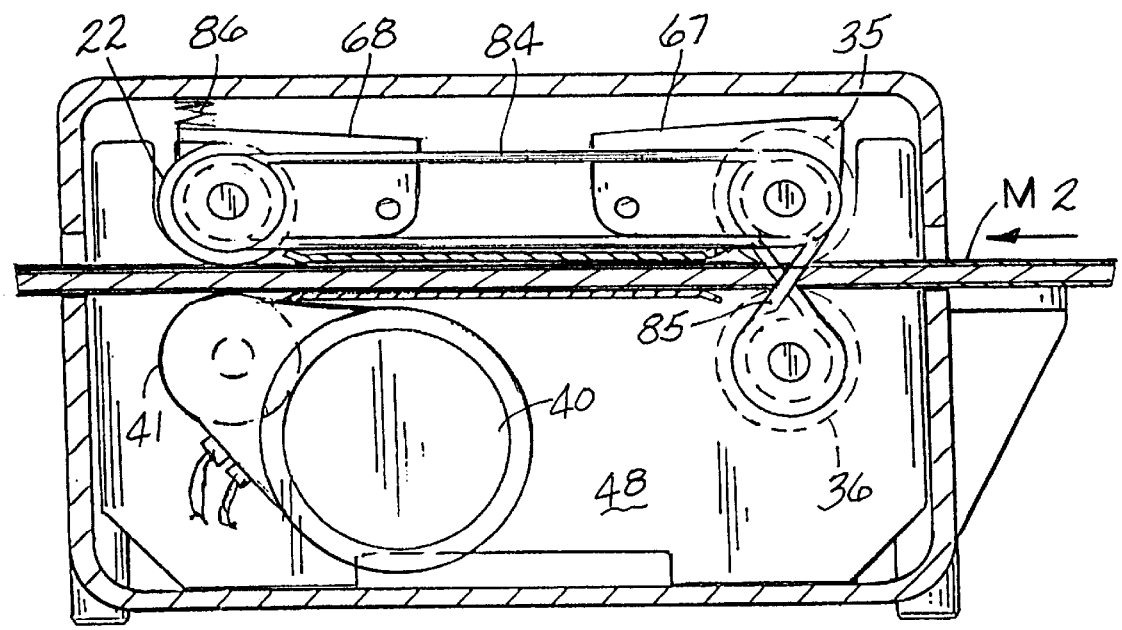

Reference is now made to FIGS. 7a and 8a which exemplify the operation of machine 10 when a thick material M2 is passed through the machine which will cause the gears of rolls 22 and 23 to separate and lose mesh and the gears of rolls 35 and 36 to separate and lose mesh.

As the thick material M2 goes between the roll pairs the bearing arms 67 and 68 pivot upwardly to accept material M2 and the gears of each pair of rolls are not in contact.

Roll 36 will drive roll 35 through pulley belt 81 and roll 22 through pulley belt 80. Roll 22 will drive roll 23 through belt 82. Thus all rolls are still in synchronization even though the primary gear drive is disengaged.

The pulley belts 81, 82 and 85 also provide a downward bias on upper rolls 22 and 35 to maintain and ensure that the upper rolls are in driving contact with a thick material M2.

The lower rolls 23 and 36 are always gear connected through idler gear 77 and thus rotate at a predetermined speed. The pulley drive system ensures that the upper rolls 22 and 35 will rotate at the same speed in synchronization with driven roll 36.

Figure 9A:
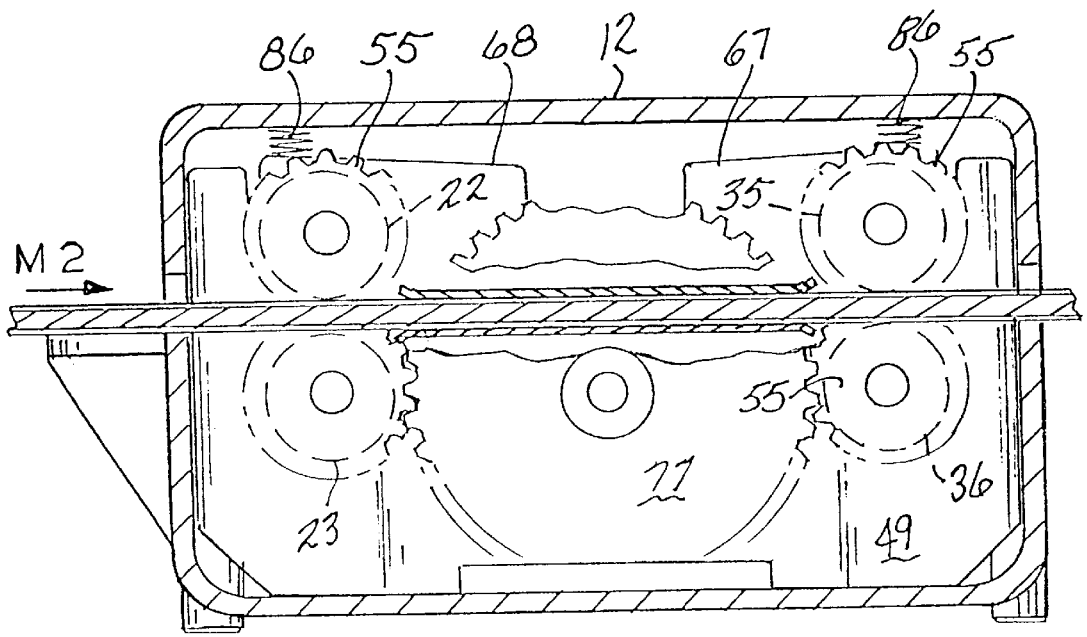
FIGS. 9a and 9b are views similar to FIGS. 7a and 8b respectively showing another embodiment of the invention which does not utilize auxiliary drive means.
Figure 9B:
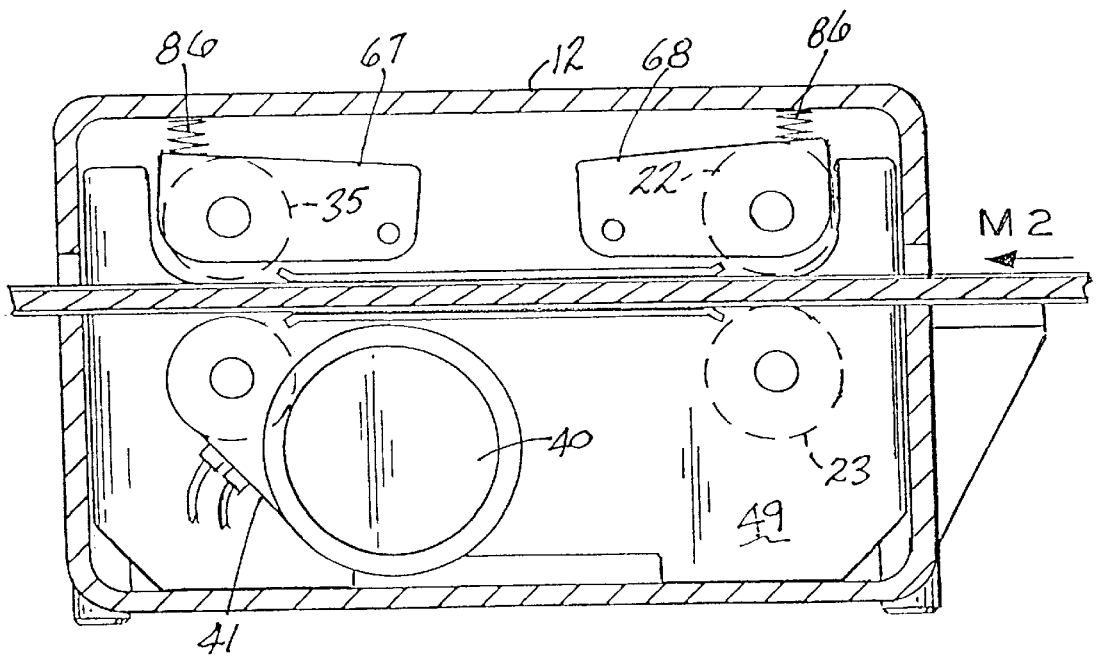

The invention may also be utilized without the auxiliary drive provided by the pulley belts. Reference is now made to FIGS. 9a and 9b which are similar to FIGS. 7a and 8a respectively, and like parts bear like reference numerals.

In FIGS. 9a and 9b the pulleys and pulley belts are not used. Instead a downward bias is provided on the bearing arms 67 and 68 by springs 86 bearing on each bearing arm. The springs 86 seated on the inside of upper housing member 12. The spring seats 87 as shown in FIG. 2 have been omitted for simplicity of illustration.

The upper rolls 22 and 35 are driven by contact with the upper surface of material M2 when the upper and lower gears 55 move out of mesh. The springs 86 will bias the upper rolls 22 and 35 through the bearing arms 86 and 87 into frictional contact with material M2.

In another embodiment of the invention the gears on the upper rolls 22 and 35 may be eliminated and the upper rolls driven in synchronism with the lower rolls by the pulley belts.

Figure 10:
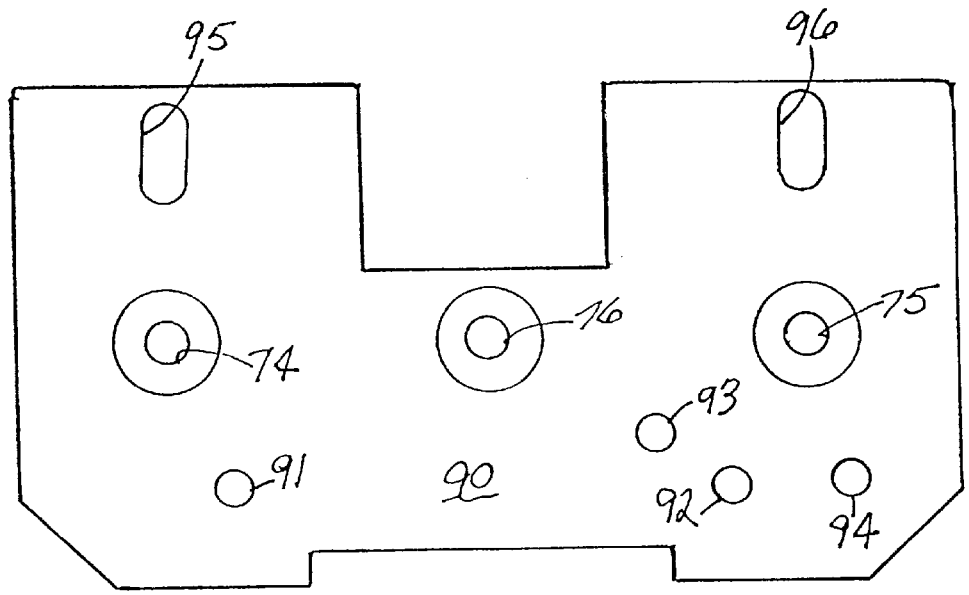
FIG. 10 is a view similar to FIG. 8a showing the motor drive end of a laminating machine utilizing an end support as shown in FIG. 9.

FIG. 10 shows another end support plate, in similar view to FIG. 6 which may be utilized in the invention. In FIG. 10 and also in FIGS. 11 and 12, similar elements to those of FIGS. 6, 7 and 8 bear the same reference numerals.

End plate 90 may be used in an embodiment of the invention where the gears on upper rolls 22 and 35 are eliminated or retained.

A laminating machine will utilize two spaced apart end plates 90. End plate 90 has bearings 74 and 75 for receiving the shafts of rolls 23 and 36, and a bearing 76 for idler gear 77. Also defined in end plate 90 are bearing apertures 91–94 for idler pulleys as will hereinafter be described.

The end plates 90 have vertical slots 95 and 96 defined therein to receive the end shafts of rolls 35 and 22 and permit vertical movement of these roll dependent upon the thickness of material M2 (FIG. 10). The end shafts of rolls 35 and 22 may be received in bearings (not shown) which slide in slots 95 and 96.

Figure 11:
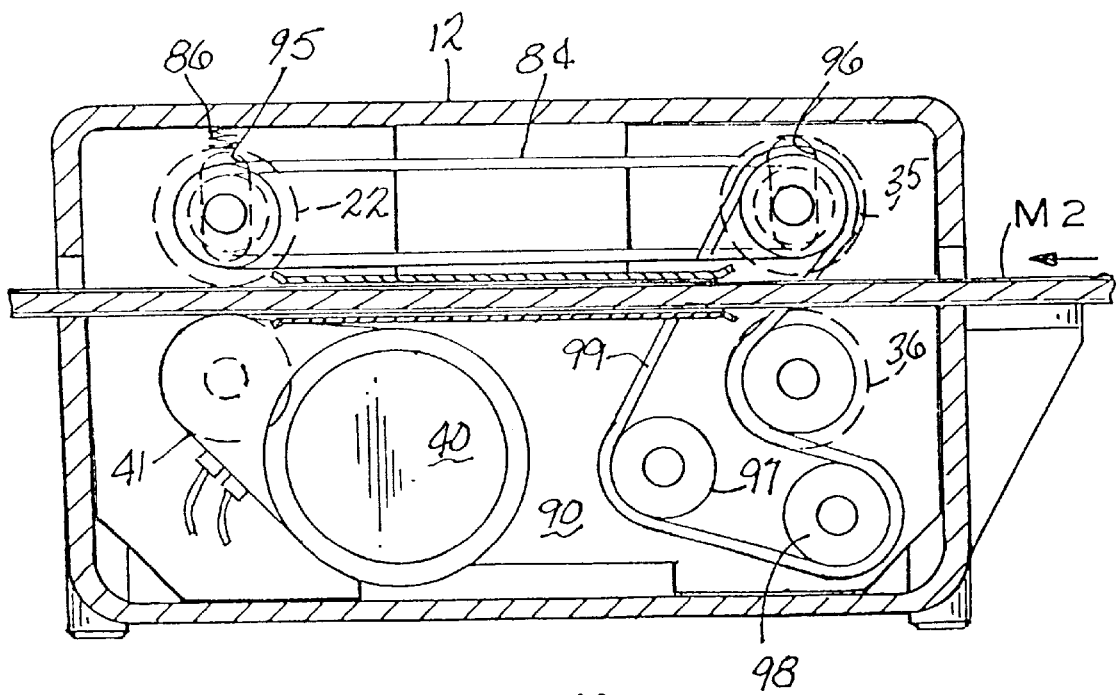
FIG. 11 is a side view showing a different auxiliary drive.

In FIG. 11 the motor drive end of the machine is illustrated similar to that shown in FIG. 8a.

The end shafts of the upper rolls may move vertically in slots 95 and 96 in the end plates 90 to accommodate the thicker material M2.

In FIG. 11 a different auxiliary drive is shown as compared to FIG. 8a. Idler pulleys 97 and 98 are provided with shafts in bearings 93 and 94 respectively (FIG. 10). A pulley belt 99 is driven by roll 36, and pulley belt 99 driven by roll 36 aids in driving roll 35.

Pulley belt 99 is driven from roll 36 and passes around idlers 97 and 98 to aid in driving upper roll 35 in synchronization with roll 36. It will be understood that such synchronization could also be achieved by the pulley and pulley belt arrangement shown in FIG. 8a. In this embodiment only one spring 86 is utilized to bias roll 22 downwardly at the driven end of roll 23.

Pulley belt 99 also serves to bias roll 35 downwardly toward roll 36 and will maintain such bias when roll 35 raises to accept thick material to be laminated as exemplified by M2. Pulley belt 84 in FIG. 10 serves the same purpose previously described.

Figure 12:
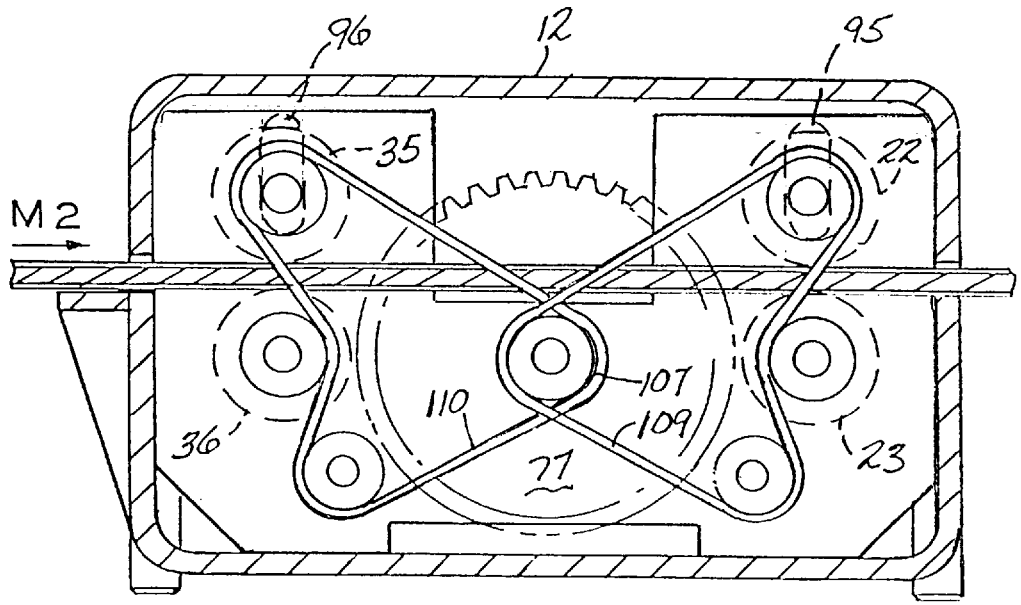
FIG. 12 is a view of the support of the end of a laminating machine opposite the end support of FIG. 11, and showing a different auxiliary drive.

Reference is now made to FIG. 12 which exemplifies the other end of the machine of FIG. 11 and utilizes the end plate 90 of FIG. 10 and shows the thick material M2 passing through. In FIG. 12 the gears 55 on the end shafts of rolls 23 and 36 to simplify illustration. However, in practice these gears are present and meshing with idler 77.

The gears on the shafts of upper rolls 22 and 35 are eliminated. Idler pulleys 105 and 106 have shafts which are received in bearing apertures 92 and 91 (FIG. 10). Also the shaft of idler gear 77 has a pulley 107 with two grooves, as shown in FIG. 5, thereon. A pulley belt 109 extends about the pulleys of rolls 22, 23, idler pulley 105 and pulley 107 on the shaft of idler gear 77. A pulley belt 110 extends about the pulleys of rolls 35, 36, idler pulley 106, and pulley 107 on the shaft of idler gear 107.

The resilient pulley belts 109 and 110 are in tension and exert a downward bias on the upper rolls 22 and 35 but permit upward movement of rolls 22 and 35 when a thick material M2 is passed through the machine. The pulley belts 109 and 110 also synchronize the speed of rotation of upper rolls 22 and 35 with lower rolls 23 and 36.

With the pulley drive arrangement of FIG. 11, upper roll 35 is driven by roll 36 and idler 77 through pulley belt 110. Upper roll 22 is driven by roll 23 and idler 77 through pulley belt 109.

As shown in FIGS. 11 and 12 the end shafts of rolls 22 and 35 have moved up in the slots 95 and 96 of end supports 90 to accommodate the thick material M2.

It is to be understood that either of the pulley arrangements shown in FIGS. 7 and 8 and in FIG. 11 may be used with laminators using either of the end plates of FIGS. 6 or 9. The laminator of FIGS. 11 and 12 may utilize gears 55 on the upper rolls. Also, the upper gears 55, on the laminator of FIGS. 7 and 8 may be eliminated A laminator embodying the invention may also be constructed using only one pair of rolls. In such embodiment the exit rolls 22 and 23 would be used with power transmission members 54 as shown in FIG. 4 and with only pulley belt 81. Only one bearing arm 68 or 69 would be used on each end support (FIGS. 6–8) to permit upward pivotal movement of roll 35. Roll 23 would drive roll 22 through the gearing on the non-driven ends as shown in FIG. 7a, or merely by a pulley belt 81.

This two roll laminator could utilize a pivotal arm 68 of FIG. 7a to rotatably support upper roll 22 or use a slot 95 or 96 (FIG. 10) to permit upward movement of the roll. The gear 55 on the upper roll could be eliminated in either construction.

The invention may be incorporated in a roll laminating machine as hereinafter described.

Figure 13:
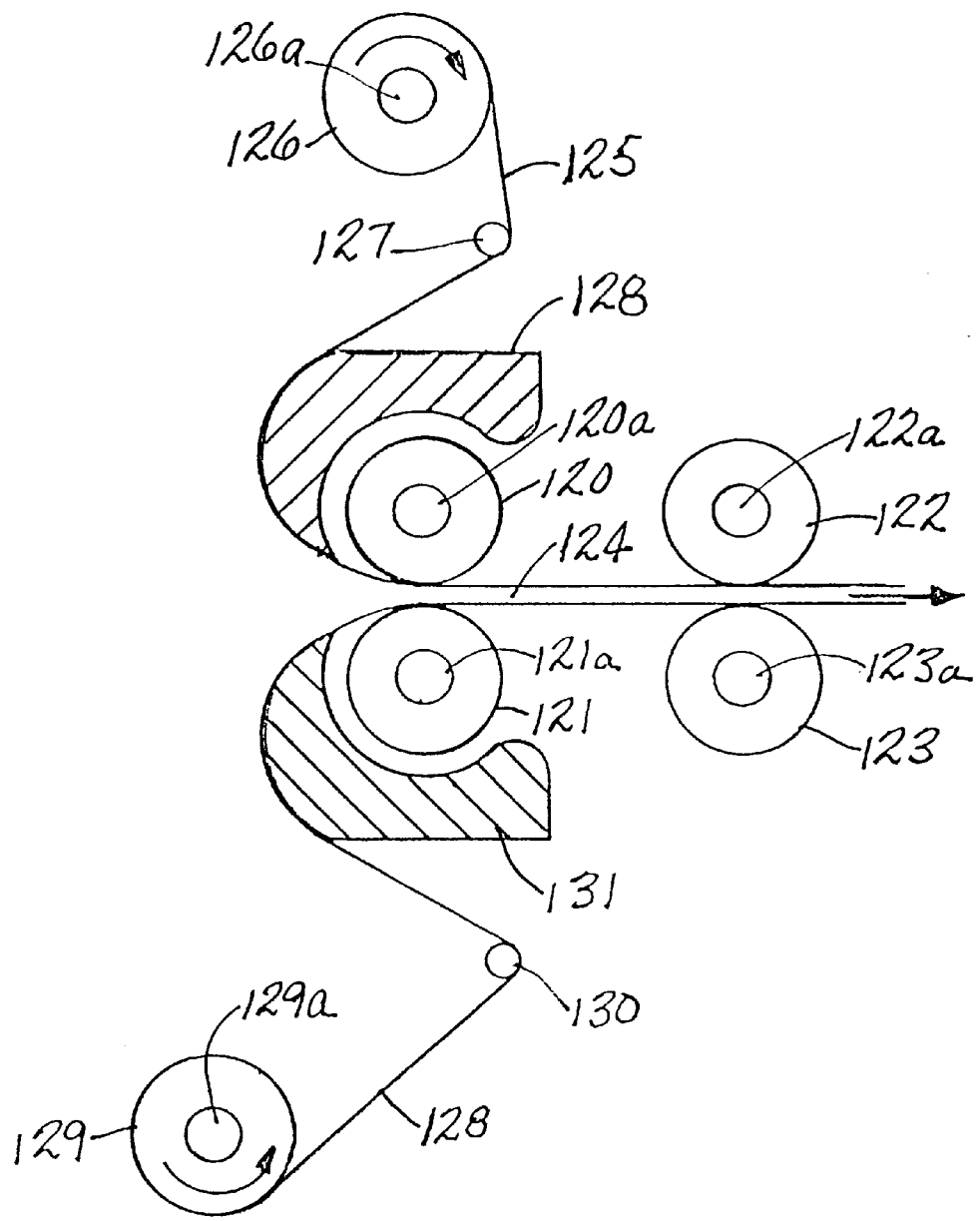
FIG. 13 is a representation of the various rolls, heat shoes and idler pulleys of a roll laminating machine.

FIG. 13 illustrates schematically the primary components of a roll laminating machine 120 in which material to be laminated is fed between two continuous sheets of laminating film.

The roll laminator of FIG. 13 comprises a first pair of laminating rolls 120 and 121 and a second pair of pull rolls 122 and 123 defining a passage 124 therethrough. Web material 125 is pulled from an upper supply mandrel 126 about an upper idler roller 127, an upper heat shoe 128 and upper laminating roll 120 into passage 124 between the nips defined by the rolls.

Web material 128 is pulled from a lower supply mandrel 129 about a lower idler roller 130, lower heat shoe 131 and lower laminating roll 121 into passage 124 between the roll nips.

The webs 125 and 128 are generally a polyester film with a heat activated adhesive resin thereon. The resin sides will be facing as the film moves between the roll nips. The films are heated as they move over the heat shoes and the adhesive becomes tacky and the pressure of the laminating rolls bonds the heated webs to the material therebetween. The laminating rolls are also heated by the adjacent heat shoes. The pull rollers maintain tension on the laminated article as it moves between a cooling means (not shown).

In a roll laminator of the type described, only the lower rolls 121 and 123 are driven as hereinafter pointed out. The nip between the rolls must be adjusted for the thickness of the material to be laminated. The shafts 120a and 122a of the upper rolls 120 and 122, respectively are subject to a downward bias to maintain the upper rolls in contact with the material, and this bias is adjusted for the thickness of the material to be laminated.

Previously, roll laminators required a separate biasing means acting on the upper rolls to set the roll nips and maintain the upper rolls in contact with the material passing through. With these previous arrangements, the upper rolls were driven only by frictional contact with the material passing through.

The end shafts 120a and 121a of the laminating rolls 120 and 121, respectively and the shafts 122a and 123a of the pull rolls are rotatably mounted in spaced apart support members with the shafts of the upper rolls received in vertically directed slots to permit vertical movement.

Figure 14:
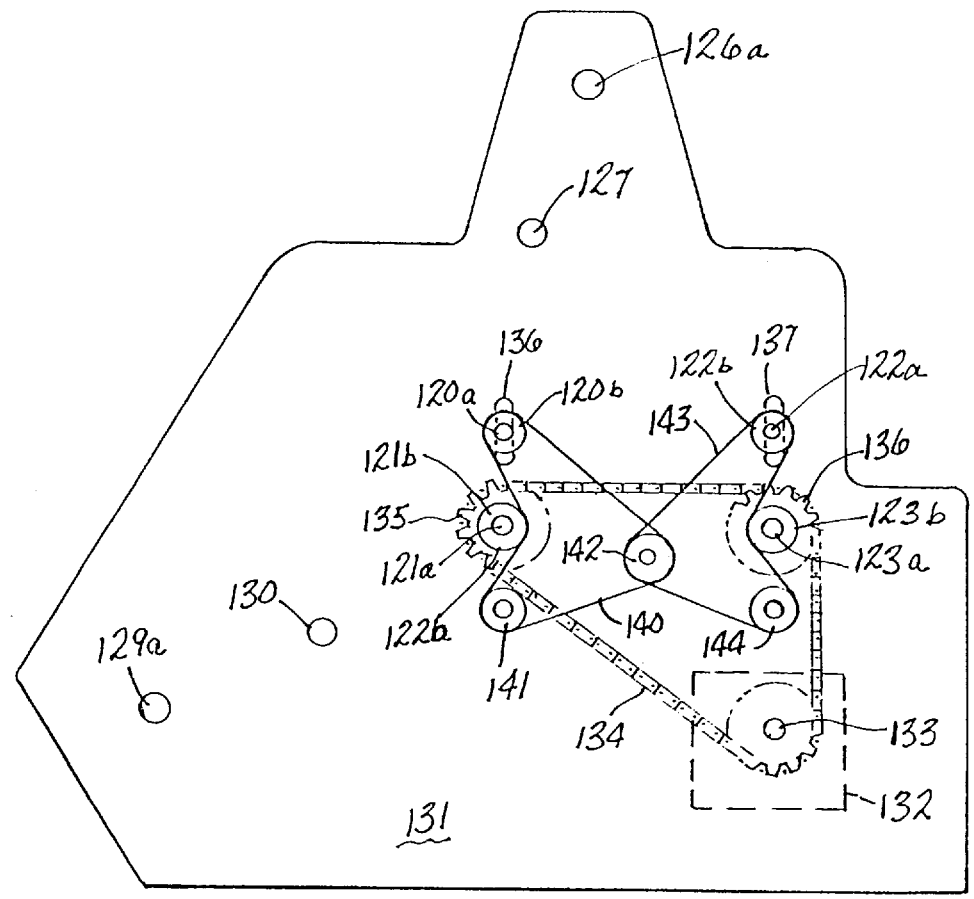
FIG. 14 is a side elevation of a roll laminating machine showing the drive end.

Reference is now made to FIG. 14 which illustrates an end support 131 of a roll laminator of the type exemplified in FIG. 12. It will be understood that the other end support is the mirror of end support 131.

The drive means for the laminator of FIG. 14 comprises a motor and gearing 132 illustrated in broken line which drive a sprocket gear 133 and sprocket chain 134. Sprocket gears 135 and 136 are on the shafts 121a and 123a of rolls 121 and 123, respectively. Thus motor and gearing 132 will drive rolls 121 and 123 shown in FIG. 13. Pulleys 120b, 121b, 122b and 123b are also on the shafts 121a–123a at either end of rolls 120–123. respectively.

Vertically directed slots 136 and 137 are defined in end support 131. Slots 136 and 137 receive the end shafts 120a and 122a of rolls 120 and 122 respectively. The slots 136 and 137 permit the upper movement of rolls 120 and 122. The end shafts may be received in bearings which slide in slots 136 and 137.

A pulley belt 140 extends about pulleys 120b, 121b and idler pulleys 141 and 142 journaled in end support 131.

Another pulley belt 143 extends about pulleys 122b and 123b and idler pulley 142 and another idler pulley 144 journaled in end support 131.

With this arrangement roll 121 will drive roll 120 and roll 123 will drive roll 122 through the resilient pulley belts 140 and 143 respectively. The pulley belts exert a downward bias on upper rolls 120 and 122, yet permit the rolls 120 and 122 to move upwardly to accept material of various thicknesses. The pulley belts further synchronize the speed of rotation of the upper rolls with the lower directly driven rolls.

The other end of the machine of FIGS. 13 and 14 has the upper and lower rolls connected by pulley belts the same as shown in FIG. 14.

It may thus be seen that the objects of the invention set forth above as well as those made apparent are efficiently attained. While preferred embodiments of the invention have been attained. While preferred embodiments of the invention have been set forth for purposes of disclosure, modifications of the disclosed embodiments as well as other embodiments of the invention may occur to others which do not depart from the spirit and scope of the invention. Accordingly, the appended claims are intended to cover all embodiments of the invention as well as modifications to the disclosed embodiments which do not depart from the spirit and scope of the invention.

What is claimed is:

1. A laminating machine of the type which laminates documents between sheets of plastic or on a substrate comprising a housing, first and second sets of upper and lower rolls within said housing having end shafts, one of said sets of rolls arranged to receive material to be laminated and move said material to the other of said sets of rolls, spaced apart end supports in said housing rotatably supporting said end shafts, drive means connected to the lower rolls of each pair to drive said lower rolls, said upper rolls of each pair mounted in said end supports to move upwardly to accommodate material of variable thickness, resilient power transmission means connected between said upper rolls and said lower rolls and driven from said lower rolls to maintain synchronization of rotation of said upper rolls with said lower rolls and to bias said upper rolls downwardly while permitting said upper rolls to move upwardly to an extent dependent on the thickness of material passing between said pairs of rolls.

2. The laminating machine of claim 1 wherein said drive means comprises a motor driving one of said lower rolls at one end thereof, gears on the other ends of said lower rolls and an idler gear on a shaft journaled in an end support between said gears and meshing with said gears.

3. The laminating machine of claim 1 where said drive means comprises a motor driving a sprocket gear at one end of said rolls, a sprocket gear on the shafts of said lower rolls and a sprocket chain around all of said sprocket gears.

4. The laminating machine of claim 2 wherein said end supports have vertically directed slots therein receiving the end shafts of said upper rolls and permitting vertical movement of said upper rolls.

5. The laminating machine of claim 2 wherein said rolls include end shafts and the end shafts of said upper rolls are rotatably supported in bearing members pivotal on said end supports to permit upward movement of said upper rolls.

6. The laminating machine of claim 2, further including gears on said upper rolls normally meshing with a gear of the mating lower roll.

7. The laminating machine of claim 2 wherein said auxiliary drive means comprises pulleys on the ends of each of said rolls and a resilient pulley belt connecting the pulley on each pair of rolls.

8. The laminating machine of claim 7 further including a pulley on the shaft of said idler gear, a first pulley about the pulleys on said first set of rolls and the pulley on said idler gear and a second resilient pulley belt about said pulleys of said second set of rolls and the pulley on said idler gear.

9. The laminating machine of claim 8 where said auxiliary drive means comprises a resilient pulley belt in a FIG. 8 configuration about the pulleys of each roll of a pair.

10. The laminating machine of claim 3 where said auxiliary drive means comprises pulleys on the shafts of said upper and lower rolls and a first pulley belt connecting the pulleys of said first set of rolls and a pulley belt connecting the pulleys of said second set of rolls.

11. The laminating machine of claim 10 where said pulleys and said pulley belts are on each end of said rolls.

12. The laminating machine of claim 3 where vertically directed slots are defined in said end supports and receive the ends of said shafts therein to permit upward movement of said upper rolls.

13. A laminating machine which comprises upper and lower heating platens defining a passage therethrough for material to be laminated, upper and lower rolls for accepting material passed between said platens, end support members for said rolls, drive means connected to the lower of said rolls at one end thereof, normally meshing gears on said rolls at the ends opposite said drive means whereby said lower roll may drive said upper roll, bearing arms pivotally mounting said upper roll to said end support members whereby said upper roll may pivot upwardly, and biasing means acting on said bearing arms to maintain said upper rolls in contact with material to be laminated when said bearing arms pivot upward to an extent where said gears are out of mesh.

14. The machine of claim 1 wherein said platens and said rolls are contained within a housing and said biasing means are provided in said housing acting on said bearing arms to bias said upper roll toward said lower roll.

15. A laminating machine of the type which laminates documents between sheets of plastic or on a substrate comprising a housing, a first set of upper and lower rolls having end shafts within said housing adapted to receive material to be laminated and move said material between upper and lower heating platens within said housing, a second set of upper and lower rolls having end shafts within said housing arranged to receive the material from said platens and discharge the material from the machine, and supports in said housing for said rolls, said roll shafts adapted to be rotatably supported between said end supports, drive means connected to one of said rolls of said one of said sets at one of said end supports and gearing means on said rolls at the other of said end supports for transmitting rotation of said one of said rolls to the others of said rolls, bearing arms pivotally mounted to said end supports and rotatably supporting the upper rolls of each pair of rolls whereby said upper rolls of each pair may pivot upwardly to accommodate material of various thickness, and biasing means in said housing acting on said bearing arms to maintain said upper rolls in contact with material to be laminated when said bearing arms pivot upwardly to an extent where the gears on said upper rolls move out of mesh with the gears on said lower rolls.

\* \* \* \* \*